US009367541B1

(12) United States Patent
Servan et al.

(10) Patent No.: US 9,367,541 B1
(45) Date of Patent: Jun. 14, 2016

(54) TERMINOLOGICAL ADAPTATION OF STATISTICAL MACHINE TRANSLATION SYSTEM THROUGH AUTOMATIC GENERATION OF PHRASAL CONTEXTS FOR BILINGUAL TERMS

(71) Applicant: Xerox Corporation, Norwalk, CT (US)

(72) Inventors: Christophe Servan, Crolles (FR); Marc Dymetman, Grenoble (FR)

(73) Assignee: XEROX CORPORATION, Norwalk, CT (US)

( * ) Notice: Subject to any disclaimer, the term of this patent is extended or adjusted under 35 U.S.C. 154(b) by 0 days.

(21) Appl. No.: 14/600,561

(22) Filed: Jan. 20, 2015

(51) Int. Cl.
*G06F 17/28* (2006.01)

(52) U.S. Cl.
CPC .................................. *G06F 17/289* (2013.01)

(58) Field of Classification Search
CPC ....................................................... G06F 17/289
USPC ..................................... 704/2, 1, 8, 256–257
See application file for complete search history.

(56) References Cited

U.S. PATENT DOCUMENTS

| | | | |
|---|---|---|---|
| 6,182,026 B1 | 1/2001 | Tillmann et al. | |
| 6,197,936 B1 | 3/2001 | Sano et al. | |
| 7,058,567 B2 | 6/2006 | Ait-Mokhtar et al. | |
| 8,543,563 B1 | 9/2013 | Nikoulina et al. | |
| 2004/0024581 A1 | 2/2004 | Koehn et al. | |
| 2004/0030551 A1 | 2/2004 | Marcu et al. | |
| 2005/0137854 A1 | 6/2005 | Cancedda | |
| 2006/0190241 A1 | 8/2006 | Goutte et al. | |
| 2007/0150257 A1 | 6/2007 | Cancedda et al. | |
| 2007/0265825 A1 | 11/2007 | Cancedda et al. | |
| 2008/0300857 A1 | 12/2008 | Barbaiani et al. | |
| 2009/0175545 A1 | 7/2009 | Cancedda | |
| 2011/0022380 A1 | 1/2011 | Zaslavskiy et al. | |
| 2011/0282643 A1 | 11/2011 | Chatterjee et al. | |
| 2011/0288852 A1 | 11/2011 | Dymetman et al. | |
| 2011/0307241 A1* | 12/2011 | Waibel .................. G10L 15/265 704/2 |
| 2011/0307245 A1* | 12/2011 | Hanneman ........... G06F 17/2827 704/4 |
| 2012/0041753 A1 | 2/2012 | Dymetman et al. | |
| 2012/0101804 A1* | 4/2012 | Roth .................... G06F 17/2818 704/2 |
| 2012/0259807 A1 | 10/2012 | Dymetman | |
| 2014/0067361 A1 | 3/2014 | Nikoulina et al. | |

(Continued)

OTHER PUBLICATIONS

Salah Aït-Mokhtar, et al., "Robustness beyond shallowness: Incremental deep parsing," Nat. Lang. Eng., 8(3):121-144 (2002).

(Continued)

*Primary Examiner* — Marcellus Augustin
(74) *Attorney, Agent, or Firm* — Fay Sharpe LLP

(57) ABSTRACT

A method for terminological adaptation includes receiving a vocabulary pair including source and target language terms. Each term is in a class which includes a set of sequences. Contextual phrase pairs are extracted from a bilingual training corpus, each including source and target phrases. The phrases each include a sequence of the same class as the respective source and target terms as well as some associated context. Templates are generated, based on the contextual phrase pairs. In each template the source and target sequences of a contextual phrase pair are replaced with respective placeholders, each denoting the respective class of the sequence. Candidate phrase pairs are generated from these templates. In each candidate phrase pair, the placeholders of one of the templates are replaced with respective terms of a vocabulary pair of the same class. Some candidate phrase pairs are incorporated into a phrase table of a machine translation system.

20 Claims, 3 Drawing Sheets

(56) References Cited

U.S. PATENT DOCUMENTS

2014/0163951 A1 6/2014 Nikoulina et al.
2014/0200878 A1* 7/2014 Mylonakis .......... G06F 17/2854
 704/4
2014/0358519 A1* 12/2014 Mirkin ................ G06F 17/2854
 704/3

OTHER PUBLICATIONS

Amittai Axelrod, et al., "Domain Adaptation via Pseudo In-Domain Data Selection," Proc. Conf. on Empirical Methods in Natural Language Processing, pp. 355-362 (2011).
Pratyush Banerjee, et al., "Domain adaptation in SMT of user-generated forum content guided by OOV word reduction: Normalization and/or supplementary data?" Proc. 16th Annual Conf. of the European Association for Machine Translation, pp. 169-176 (2012).
Stanley F. Chen et al., "An empirical study of smoothing techniques for language modeling," Computer Speech and Language, 4(13):359-394 (1999).
Jonathan H. Clark, et al., "Better hypothesis testing for statistical machine translation: Controlling for optimizer instability," Proc. 49th Annual Meeting of the Assoc. for Computational Linguistics: Human Language Technologies, pp. 176-181 (2011).
Matthias Eck, et al., "Language model adaptation for statistical machine translation based on information retrieval," Proc. Intern'l Conf. on Language Resources and Evaluation (LREC), pp. 327-330 (2004).
Andreas Eisele, et al., "MultiUN: A Multilingual Corpus from United Nation Documents," Proc. 7th Conf. on Intern'l Language Resources and Evaluation (LREC'10), pp. 2868-2872 (2010).
Nizar Habash, "Four techniques for online handling of out-of-vocabulary words in Arabic-English statistical machine translation," Proc. ACL 08, HLT Short papers, pp. 57-60 (2008).
Philipp Koehn, et al., "Moses: Open Source Toolkit for Statistical Machine Translation," Proc.45th Annual Meeting of the Assoc. For Computational Linguistics Companion Volume Proc. Demo and Poster Sessions, pp. 177-180 (2007).
Philipp Koehn, "Europarl: A parallel corpus for statistical machine translation," Proc. 10th Machine Translation Summit (MT Summit X), pp. 79-86 (2005).
Robert C. Moore, et al., "Intelligent selection of language model training data," Proc. ACL (Short Papers), pp. 220-224 (2010).
Vassilina Nikoulina, et al., "Hybrid adaptation of named entity recognition for statistical machine translation," 24th Intern'l Conf. on Computational Linguistics (COLING 2012), pp. 1-16 (2012).
Franz Josef Och, "Minimum Error Rate Training in Statistical Machine Translation," Proc. 41st Annual Meeting of the Assoc. for Computational Linguistics, pp. 160-167. 2003.
Kishore Papineni, et al., "BLEU: a method for automatic evaluation of machine translation," Proc.40th Annual Meeting of the Assoc. of Computational Linguistics (ACL), pp. 311-318 (2002).
Raivis Skad Skadiņš š, "Application of online terminology services in statistical machine translation," Proc. XIV Machine Translation Summit, pp. 281-286 (2013).
Matthew Snover, et al., "A study of translation edit rate with targeted human annotation," Proc. 5th Conf. of the Assoc. for Machine Translation in the Americas (AMTA), pp. 223-231 (2006).
Andreas Stolcke, "SRILM—an extensible language modeling toolkit," Proc. ICSLP, pp. 1-4 (2002).

* cited by examiner

TERMINOLOGICAL ADAPTATION OF STATISTICAL MACHINE TRANSLATION SYSTEM THROUGH AUTOMATIC GENERATION OF PHRASAL CONTEXTS FOR BILINGUAL TERMS

BACKGROUND

The exemplary embodiment relates to machine translation and finds particular application in connection with a system and method for terminological adaptation of a statistical machine translation system based on phrasal context.

Statistical Machine translation (SMT) systems are widely used for translation of text from a source language to a target language. The systems often include a translation model that has been trained on parallel corpora, that is on pairs of sentences in the source and target language that are known or expected to be translations of each other. From the bi-sentences, phrase pairs are extracted, together with their translation probabilities. Large corpora are used for training the system to provide good translation performance. Such corpora tend to be domain specific, such as the Europarl corpus of translations of text of the European Parliament. Since the translation models in SMT rely heavily on the data they have been trained on, they may not provide as good performance outside that domain. For example the French word "pastille" may have several translations according to the domain: in medicine "une pastille" is translated as "a pill," in the nuclear domain, it means "a pellet."

One solution is to adapt the SMT system to a domain of interest by adding lexical information to the translation model. For example, methods have been proposed to extract specific terminology from bilingual corpora (which are either parallel or comparable). These approaches aim to build dictionaries that avoid OOV words by adding these words to the training corpus, using the dictionary as a translation memory in addition to the Translation Model, or using pre- or post-processing to avoid the OOV problem. See, Nizar Habash, "Four techniques for online handling of out-of-vocabulary words in Arabic-English statistical machine translation," Proc. ACL 08, HLT Short papers, pp. 57-60 (2008), hereinafter, "Habash 2008"; Pratyush Banerjee, et al., "Domain adaptation in SMT of user-generated forum content guided by OOV word reduction: Normalization and/or supplementary data?" Proc. 16th Ann. Conf. of the European Assoc. for Mach. Translation, pp. 169-176 (2012); and Vassilina Nikoulina, et al., "Hybrid adaptation of named entity recognition for statistical machine translation," 24th Intl Conf. on Computational Linguistics (COLING 2012), pp. 1-16 (2012). However, adding individual words without their phrasal contexts (that is, individual words as opposed to phrases containing these words) does not make effective use of the capabilities of phrase-based SMT. A system limited to unigram-unigram pairs performs much worse than one containing multigram phrase pairs.

Other methods of domain adaptation of SMT systems focus on training data selection. For example, Information Retrieval approaches have been used to extract the parts of the corpus that are the most relevant to a domain (Matthias Eck, et al., "Language model adaptation for statistical machine translation based on information retrieval," Proc. Intl Conf. on Language Resources and Evaluation (LREC), pp. 327-330 (2004)). Cross-entropy has also been used to select the most relevant parts of the training data (Robert C. Moore, et al., "Intelligent selection of language model training data," Proc. ACL (Short Papers), pp. 220-224 (2010), hereinafter, "Moore 2010"; Amittai Axelrod, et al., "Domain Adaptation via Pseudo In-Domain Data Selection," Proc. Conf. on Empirical Methods in Natural Language Processing, pp. 355-362 (2011), hereinafter, "Axelrod 2011"). In another approach, training data is selected according to a specific terminology by selecting the bi-sentences that contain only the specific terminology, without modifying the training process (Raivis Skadinŝ, "Application of online terminology services in statistical machine translation," Proc. XIV Machine Translation Summit, pp. 281-286 (2013)). However, these approaches tend to result in loss of data. In Axelrod's approach, for example, the data selection is a hard selection, i.e., the method simply removes what is not considered as in-domain. Using this kind of approach can create a large number of Out-Of-Vocabulary (OOV) words, even when translating in-domain data. This is particularly problematic when there is a relatively small amount of training data for the selected language pair to start with.

There remains a need for a system and method for terminological adaptation of a machine translation system which addresses these problems.

INCORPORATION BY REFERENCE

The following references, the disclosures of which are incorporated herein in their entireties by reference, are mentioned:

U.S. Pub. No. 20140163951, published Jun. 12, 2014, entitled HYBRID ADAPTATION OF NAMED ENTITY RECOGNITION, by Vassilina Nikoulina, et al.

U.S. Pub. No. 20140067361, published Mar. 6, 2014, entitled LEXICAL AND PHRASAL FEATURE DOMAIN ADAPTATION IN STATISTICAL MACHINE TRANSLATION, by Vassilina Nikoulina, et al.

U.S. Pub. No. 20140200878, published Jul. 17, 2014, entitled MULTI-DOMAIN MACHINE TRANSLATION MODEL ADAPTATION, by Markos Mylonakis, et al.

U.S. Pat. No. 8,543,563, published Sep. 24, 2013, entitled DOMAIN ADAPTATION FOR QUERY TRANSLATION, by Vassilina Nikoulina, et al.

U.S. Pat. No. 7,058,567, issued Jun. 6, 2006, entitled NATURAL LANGUAGE PARSER, by Ait-Mokhtar, et al.

Phrase based machine translation systems are disclosed, for example, in U.S. Pat. No. 6,182,026 and U.S. Pub. Nos. 20040024581; 20040030551; 20060190241; 20070150257; 20070265825; 20080300857; 20110022380; 20110178791; 20110282643; 20110288852; 20110307245; 20120041753; 20120101804; and 20120259807.

Methods for evaluating the quality of machine translation are disclosed, for example, in U.S. Pub. Nos. 20050137854 and 20090175545 and U.S. Pat. No. 6,917,936.

BRIEF DESCRIPTION

In accordance with one aspect of the exemplary embodiment, a method for terminological adaptation of a machine translation system includes receiving a set of one or more vocabulary pairs. Each vocabulary pair includes a source term in a source language and a target term in a target language. Each term is in a class which includes a set of sequences. Contextual phrase pairs are extracted from a bilingual training corpus. Each of the contextual phrase pairs includes a source phrase and a target phrase. The source phrase includes a source sequence of a same class as the source term of one of the vocabulary pairs and associated source context. The target phrase includes a target sequence of a same class as the target term of the one of the vocabulary pairs and associated target context. The method further includes generating templates based on the extracted contextual phrase pairs. Each template replaces the source and target sequences of a contextual phrase pair with respective source and target placeholders denoting the respective class. At least one candidate phrase pair is generated from each template. In each candidate phrase pair, the source and target placeholders of a template are replaced with respective source and target terms of a vocabulary pair of the same class as the respective placeholder. At least some of the candidate phrase pairs are incorporated into a phrase table of a machine translation system.

At least one of the extracting contextual phrase pairs, generating templates, and generating candidate phrase pairs may be performed with a processor.

In accordance with another aspect of the exemplary embodiment, a system for terminological adaptation of an associated machine translation system is provided. The system includes an extraction component which extracts contextual phrase pairs from an associated bilingual training corpus. Each of the contextual phrase pairs includes a source phrase and a target phrase. The source phrase includes a source sequence of a same class as a source term of an input vocabulary pair and respective associated context. The target phrase includes a target sequence of a same class as a target term of the input vocabulary pair and respective associated context. A template generator generates templates based on the extracted contextual phrase pairs, each template replacing the source and target sequences of a contextual phrase pair with respective source and target placeholders denoting the respective class. A phrase table entry generation component generates at least one candidate phrase pair from each template. Each candidate phrase pair replaces the source and target placeholders of a template with respective source and target terms of the input vocabulary pair. At least some of the candidate phrase pairs are incorporated into a phrase table of a machine translation system. A processor implements the extraction component, template generator, and phrase table entry generation component.

In accordance with another aspect of the exemplary embodiment, a method for terminological adaptation of a machine translation system to a target domain is provided. The method includes extracting contextual phrase pairs from an out-of-domain bilingual training corpus of the form $\alpha\beta\gamma \leftrightarrow \alpha'\beta'\gamma'$, each of the contextual phrase pairs including a source phrase $\alpha\beta\gamma$ and a target phrase $\alpha'\beta'\gamma'$. The source phrase includes a source sequence $\beta$, which is of a same class T as a source term $\delta$ of an input vocabulary pair in a target domain, and respective associated context $\alpha$, $\gamma$. The target phrase includes a target sequence $\beta'$ of a same class T' as a target term $\delta'$ of the input vocabulary pair and respective associated context $\alpha'$, $\gamma'$. Based on the extracted contextual phrase pairs, candidate phrase pairs of the form $\alpha\delta\gamma \leftrightarrow \alpha'\delta'\gamma'$ are generated where $\delta$ replaces $\beta$ and $\delta'$ replaces $\beta'$, respectively, in one of the extracted contextual phrase pairs. The method further includes filtering the extracted candidate phrase pairs and incorporating at least some of the remaining candidate phrase pairs into a phrase table of a machine translation system.

At least one of the extracting contextual phrase pairs and generating candidate phrase pairs may be performed with a processor.

DETAILED DESCRIPTION

Aspects of the exemplary embodiment relate to a system and method for terminological adaptation of a machine translation system by adding additional phrase pairs. Rather than simply adding bilingual terms to the phrase table of a translation model, the exemplary system and method enable adding specific vocabulary terms together with their phrasal context. The bilingual terms can come from a specific terminology dictionary. For example, the added vocabulary may include specific translations of names, adjectives, or verbs, such as Named Entities (NE). The system and method are particularly suited to adapting a translation system for use in translation in a specific domain. In particular, some domains use terms that are not very common in the usual sources of bilingual text that is used for training machine translation systems. Examples of such specific terminological domains include physics, legal, medical, and information technology.

The exemplary method automatically generates translation hypotheses (candidate phrase pairs) using templates generated from contextual phrase pairs extracted from a bilingual training corpus of bi-sentences. In each template, source and target phrases each include a place-holder for accepting the respective bilingual terms as well as some preceding and/or following context. The placeholders replace respective sequences of the contextual phrase pairs. To improve the quality of the generated phrase pairs, filtering may be performed, for example, by using cross-entropy difference scores for sorting the candidate phrase pairs. At least some of the phrase pairs can be incorporated in a translation model of a machine translation system.

A "phrase pair" includes a source phrase in the source language and a target phrase in the target language, which are predicted to be translations of each other, in at least the source to target direction, for example because they were extracted from aligned sentence pairs in a bilingual corpus. Each phrase includes one or more words and at least some of the phrase pairs include at least two or at least three words.

The term "contextual phrase pair" refers to a phrase pair in which each phrase includes a sequence of one or more words together with some preceding and/or following context. The context includes one or more words. Each sequence is associated with a predefined class of sequences.

Figure 1:
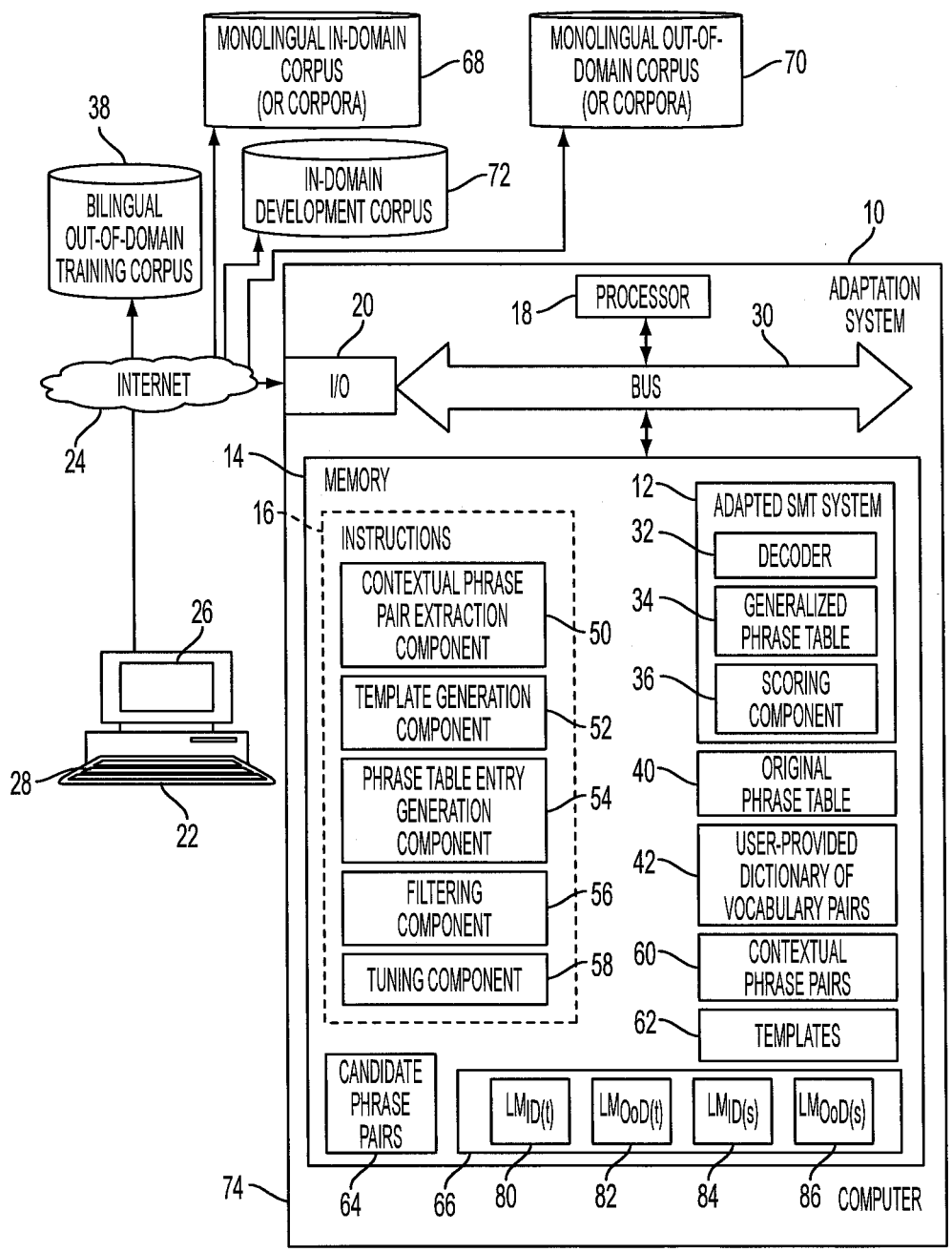
FIG. 1 is a functional block diagram of a system for domain adaptation of an SMT system in accordance with one aspect of the exemplary embodiment.

With reference to FIG. 1, a functional block diagram of a computer-implemented system 10 for terminological adaptation of an SMT system 12 is shown. The illustrated computer system 10 includes memory 14 which stores instructions 16 for performing the method illustrated in FIG. 2 and a processor 18 in communication with the memory for executing the instructions. The system 10 also includes one or more input/output (I/O) devices 20, such as a network interface and/or a user input output interface. The I/O interface 20 may communicate with a user interface 22, via a wired or wireless link 24, such as a local area network or a wide area network, such as the Internet. The user interface 22 includes one or more of a display device 26, for displaying information to users, and a user input device 28, such as a keyboard or touch or writable screen, and/or a cursor control device, such as mouse, trackball, or the like, for inputting text and for communicating user input information and command selections to the system. The various hardware components 14, 18, 20 of the system 10 may be all connected by a data/control bus 30.

The exemplary adapted phrase-based SMT system 12 generated by the exemplary system 10 and method, is configured for receiving source text in a source natural language and outputting a translation of the source text in a target natural language. Generally, the target natural language is different from the source language. The translation is performed by a decoder 32 using phrase pairs (bi-phrases) drawn from a generalized (domain-adapted) phrase table 34. The illustrated SMT system 12 includes a scoring component 36, which scores candidate translations generated by the decoder. The scoring component 36 may include a translation model (TM), a language model (LM), and a reordering model (RM), which generate probabilities for a candidate translation that may be combined in a log-linear scoring function. The translation model computes the probability that a target string (e.g., sentence) is the translation of the source string using the probabilities of each of the phrase pairs retrieved from the generalized phrase table 34. The language model computes the probability of observing the target string, based on the probabilities of seeing n-grams of the target string in a target corpus. The reordering model computes the probability of observing the phrase reordering between the source and target strings.

The system has access to a bilingual training corpus 38 which includes a set of sentence pairs (bi-sentences), each including a source sentence and a target sentence, which may have been generated from out-of-domain parallel corpora. The training corpus 38 is used by the system 10 to generate an original (out-of-domain) phrase table 40, which includes a set of features, such as lexical and phrasal translation probabilities, for each of a set of phrase pairs extracted from the training corpus 38.

A dictionary 42 is provided, e.g., by a user, which can be considered as a domain-specific phrase table. The dictionary 42 includes a set of one or more entries (vocabulary pairs), each entry including a vocabulary term in the source language and a corresponding vocabulary term in the target language which is a translation of the source term in the domain of interest. Each vocabulary term is in a class, each class also including a plurality of sequences, one or more of which occur in the bilingual training corpus 38.

The illustrated software instructions 16 are used to generate the generalized phrase table 34 from the original phrase table 40 and the dictionary 42.

The exemplary instructions 16 include a contextual phrase pair extraction component 50, a template generation component 52, a phrase table entry generation component 54, a filtering component 56, and a tuning component 58.

The contextual phrase pair extraction component 50 extracts contextual phrase pairs 60 from the aligned sentence pairs in the training corpus 38 (or from previously extracted phase pairs, e.g., in phrase table 40). Each contextual phrase pair 60 includes a source phrase in the source language and a corresponding target phrase in the target language. Each phrase includes a sequence of the same class as the vocabulary term of an entry in the user-provided dictionary 42, as well as some surrounding context (one or more words on one or both sides of the sequence in the respective source or target language).

The template extraction component 52 generates a template 62 by substituting a respective placeholder denoting the class for the source and target sequences in a set of contextual phrase pairs having the same context and class of sequence.

The phrase table entry generation component 54 generates a candidate phrase pair 64 as a candidate for adding to the generalized phrase table 34. This is achieved by substituting the source and target vocabulary terms of an entry in the user-provided dictionary 42 for the source and target placeholders in a template when the respective classes are the same.

Optionally, the filtering component 56 filters the candidate phrase pairs 64. The filtering of candidate phrase pairs may be based on at least one of linguistic rules and a measure of proximity to an in-domain monolingual corpus. The filtering may include removing those candidate phrase pairs having a cross entropy difference above a threshold (i.e., those which do not have a relatively high proximity to the in-domain corpus). The filtering component 56 may make use of a set 66 of language models which are built from in-domain and out-of-domain monolingual corpora 68, 70, each corpus including a collection of target language sentences in the respective domain. In applying linguistic rules, the filtering may consider linguistic information associated with the dictionary entry in selecting which candidate phrase pairs to remove/keep. After filtering, some or all of the remaining phrase pairs are added to the generalized phrase table 34.

The phrase table entry generation component 52 adds the remaining candidate phrase pairs to the original phrase pairs 40 to generate the generalized phrase table 34, optionally associating one or more features with each new phrase pair, which may be derived from the respective set of contextual phrase pairs 60.

The tuning component 58 optionally tunes the SMT system 12, using the generalized phrase table 34 that includes the new phrase pairs 64. The tuning may include adjusting the feature values of the phrase pairs in the generalized phrase table 34 and/or generating weights for the language model, translation model, and reordering model scores in a log-linear scoring function used by the scoring component 36. A small in-domain bilingual development corpus 72 may be provided for this purpose. The tuning can be performed in the same way as is conventionally used for tuning an SMT system, and will not be described further. As will be appreciated, once the generalized phrase table 34 has been built, it may be output to a separate computer system for use in an SMT system 12 to perform translation.

The computer system 10 may include one or more computing devices 74, such as a PC, such as a desktop, a laptop, palmtop computer, portable digital assistant (PDA), server computer, cellular telephone, tablet computer, pager, combination thereof, or other computing device capable of executing instructions for performing the exemplary method.

The memory 14 may represent any type of non-transitory computer readable medium, such as random access memory (RAM), read only memory (ROM), magnetic disk or tape, optical disk, flash memory, or holographic memory. In one embodiment, the memory 14 comprises a combination of random access memory and read only memory. In some embodiments, the processor 18 and memory 14 may be combined in a single chip.

The network interface 20 allows the computer to communicate with other devices via a computer network, such as a local area network (LAN) or wide area network (WAN), or the internet, and may comprise a modulator/demodulator (MODEM) a router, a cable, and and/or Ethernet port.

The digital processor device 18 can be variously embodied, such as by a single-core processor, a dual-core processor (or more generally by a multiple-core processor), a digital processor and cooperating math coprocessor, a digital controller, or the like. The digital processor 18, in addition to executing instructions 16 may also control the operation of the computer 74.

The term "software," as used herein, is intended to encompass any collection or set of instructions executable by a computer or other digital system so as to configure the computer or other digital system to perform the task that is the intent of the software. The term "software" as used herein is intended to encompass such instructions stored in storage medium such as RAM, a hard disk, optical disk, or so forth, and is also intended to encompass so-called "firmware" that is software stored on a ROM or so forth. Such software may be organized in various ways, and may include software components organized as libraries, Internet-based programs stored on a remote server or so forth, source code, interpretive code, object code, directly executable code, and so forth. It is contemplated that the software may invoke system-level code or calls to other software residing on a server or other location to perform certain functions.

As will be appreciated, FIG. 1 is a high level functional block diagram of only a portion of the components which are incorporated into a computer system 10. Since the configuration and operation of programmable computers are well known, they will not be described further.

Figure 2:
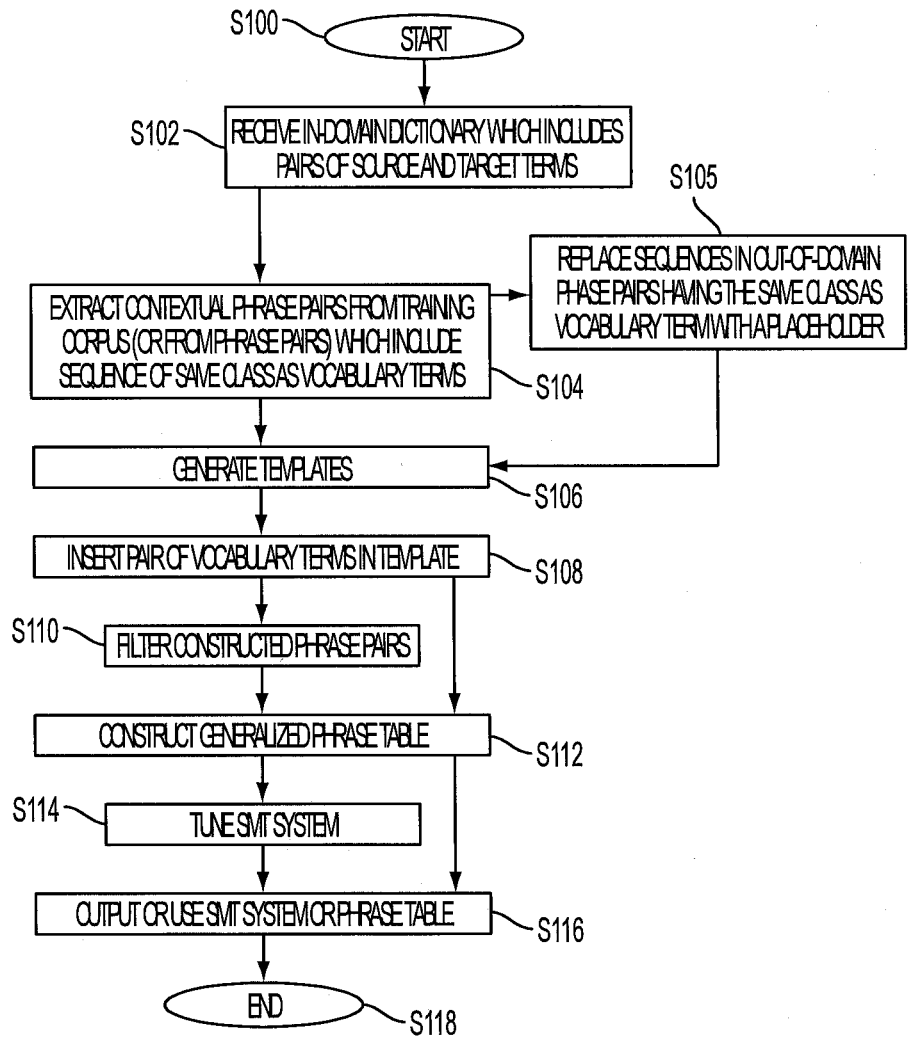
FIG. 2 is a flow chart illustrating a method for domain adaptation of an SMT system in accordance with another aspect of the exemplary embodiment.

FIG. 2 illustrates a method for domain adaptation of an SMT system 12 which can be performed with the system 10. The method begins at S100.

At S102, an in-domain dictionary 42 is received.

At S104, for each dictionary entry, contextual phrase pairs 60 are extracted, by the extraction component 50, from aligned sentence pairs in an out-of-domain training corpus 38 (or from previously extracted phase pairs in the phrase table 40). Each source/target phrase in the contextual phrase pair includes a sequence matching the class of the respective source/target term in the dictionary entry, as well as its associated context for the sequence.

In other embodiments, at S105, the extracted phrase pairs 60 from the out-of-domain training corpus 38 are parsed to identify sequences matching the classes of the dictionary entry/entries. These may be replaced with placeholders after the extraction of the contextual phrase pairs. In this case, the contextual phrase pairs may include placeholders as well as contextual information.

At S106, templates 62 are generated, by the template extraction component 52, by substituting a placeholder denoting the class for each of the respective sequences in a set of contextual phrase pairs having the same context and class. The templates 62, or the contextual phrase pairs 60 extracted at S104, which are effectively template instances, may be filtered to remove those which do not comply with linguistic tags of the respective terms of the dictionary entry.

At S108, for each template 62, at least one candidate phrase pair 64 is generated as a candidate for adding to the generalized phrase table 34, by the phrase table entry generation component 54. This includes substituting the entry in the user-provided dictionary 42 for the placeholder and optionally including values one or more phrase pair features, such as forward and backward lexical and phrasal probabilities, which may be derived from the respective set of contextual phrase pairs 60. These feature values may be modified during the tuning stage.

As will be appreciated, steps S106 and S108 could be combined into a single step, i.e., by direct substitution of the dictionary phrase pair for the corresponding sequences in the contextual phrase pair However, when there are multiple entries in the dictionary 42 of the same class, creating a template is advantageous and saves computational time.

Optionally, at S110, the candidate phrase pairs 64 are filtered, by the filtering component 56, e.g., based on a cross-entropy difference, as described in further detail below.

At S112, the generalized phrase table 34 is generated, by the phrase table entry generation component 54, by adding the remaining phrase pairs 64 to the existing phrase table 40. The target side vocabulary terms 42 and/or target side of the new phrase pairs 64 may also be added to the Language Model of the SMT system with probabilities based on the contextual phrase pairs from which they were derived.

Optionally, at S114, the SMT system 12 is tuned by the tuning component 58.

At S116, the SMT system, or the generalized phrase table, may be output and/or used for performing statistical machine translation. When used for performing machine translation, the SMT system 12 receives as input text in the source language, such as one or more sentences in the target domain. The decoder draws phrase pairs from the phrase table 34 which are used to cover the source text. The scoring component 36 scores arrangements of the phrase pairs to identify an optimum translation.

The method ends at S122.

As will be appreciated, the steps of the method need not all proceed in the order illustrated and fewer, more, or different steps may be performed.

The method illustrated in FIG. 2 may be implemented in a computer program product that may be executed on a computer. The computer program product may comprise a non-transitory computer-readable recording medium on which a control program is recorded (stored), such as a disk, hard drive, or the like. Common forms of non-transitory computer-readable media include, for example, floppy disks, flexible disks, hard disks, magnetic tape, or any other magnetic storage medium, CD-ROM, DVD, or any other optical medium, a RAM, a PROM, an EPROM, a FLASH-EPROM, or other memory chip or cartridge, or any other non-transitory medium from which a computer can read and use. The computer program product may be integral with the computer 74 (for example, an internal hard drive of RAM), or may be separate (for example, an external hard drive operatively connected with the computer 74), or may be separate and accessed via a digital data network such as a local area network (LAN) or the Internet (for example, as a redundant array of inexpensive of independent disks (RAID) or other network server storage that is indirectly accessed by the computer 74, via a digital network).

Alternatively, the method may be implemented in transitory media, such as a transmittable carrier wave in which the control program is embodied as a data signal using transmission media, such as acoustic or light waves, such as those generated during radio wave and infrared data communications, and the like.

The exemplary method may be implemented on one or more general purpose computers, special purpose computer(s), a programmed microprocessor or microcontroller and peripheral integrated circuit elements, an ASIC or other integrated circuit, a digital signal processor, a hardwired electronic or logic circuit such as a discrete element circuit, a programmable logic device such as a PLD, PLA, FPGA, Graphical card CPU (GPU), or PAL, or the like. In general, any device, capable of implementing a finite state machine that is in turn capable of implementing the flowchart shown in FIG. 2, can be used to implement the adaptation method. As will be appreciated, while the steps of the method may all be computer implemented, in some embodiments one or more of the steps may be at least partially performed manually. As will also be appreciated, the steps of the method need not all proceed in the order illustrated and fewer, more, or different steps may be performed.

Further details of the system and method, with illustrative examples, will now be described.

The Domain-Specific Dictionary

The dictionary 42 may include a set of pairs of vocabulary terms (phrase pairs) which are specific to a domain of interest. The vocabulary pairs in the dictionary, however, are without any associated features that are conventionally found in a phrase table, such as lexical or phrasal probabilities. Each vocabulary pair includes a source term (phrase) and a corresponding target term (phrase), the source term including a sequence of one or more words in the source language and the target term including a sequence of one or more words in the target language. The vocabulary pairs in the dictionary 42 may be tagged according to their class. For example, the vocabulary pairs may each be tagged with a broad class, such as Named Entity, or a narrower class, such as Country, or a domain-specific class, such as a medical class, e.g., Disease or Pharmaceutical, which may be selected from an ontology, such as a medical ontology, where each class in the ontology includes a set of terms. In some cases, the vocabulary pairs may be tagged with linguistic information. This may include grammatical information, such as appropriate declension (e.g., in relation to number (e.g., singular or plural), gender (e.g., masculine or feminine), or grammatical case), verb tense, morphology (e.g., part of speech) or the like, depending on the languages being considered and the type of phrases. In some cases, the dictionary 42 may be automatically generated, for example, by selecting terms from a medical ontology in one or more classes of interest and identifying their translations from an appropriate in-domain terminological dictionary.

The class for the sequence being replaced in the contextual phrase pair 60 can be determined by parsing the training corpus 38 with a parser and tagging phrases having the corresponding class. For example, the parser may include a named entity recognition component, as described, for example, in U.S. Pub. Nos. 20140163951. The parser may parse each sentence to generate a sequence of tokens, assigning morphological information to the words, such as identifying nouns and noun phrases and tagging some of these as named entities, e.g., by using a named entity dictionary, online resource, or the like. Each named entity may be associated with a respective class selected from a predetermined set of named entity types, such as PERSON, DATE, ORGANIZATION, PLACE, or more fined-grained named entity types, such as COUNTRY, CITY, and the like. Where an ontology is being used, sequences corresponding to terms in the selected ontology class can be tagged with the class.

Context Generation (S104-S108)

The approach to generalization can be described by the following deduction rule:

$$\frac{\alpha\beta\gamma \leftrightarrow_{pt} \alpha'\beta'\gamma'; \delta \leftrightarrow_{lex} \delta'; \beta, \delta : T; \beta', \delta' : T'}{\alpha\delta\gamma \leftrightarrow_{gpt} \alpha'\delta'\gamma'}, \quad (1)$$

where ' denotes the target side and no superscript denotes the source side.

each Greek letter $\alpha$, $\beta$, $\gamma$, $\alpha'$, $\beta'$, $\gamma'$ denotes a sequence of words, where $\alpha$ and $\gamma$ are considered as left and right contexts, respectively, for the sequence $\beta$, and $\alpha'$ and $\gamma'$ are left and right contexts for the sequence $\beta'$, T and T'denote respective types (classes), pt represents the original phrase-table 40 extracted from the bilingual out-of-domain corpus 38, lex represents the user-provided dictionary 42 asserting some lexical correspondences, and gpt represents the generalized phrase-table 34 that is obtained as a result of applying the deductions.

The rule states that for a given entry $\alpha\beta\gamma \leftrightarrow_{pt} \alpha'\beta'\gamma'$ in the standard phrase-table 40 and a user-provided entry $\delta \leftrightarrow_{lex} \delta'$ in the dictionary 42, and if $\beta$ and $\delta$ are of the same class T (resp. $\beta'$, $\delta'$ and T'), then a new entry can be generated: $\alpha\delta\gamma \leftrightarrow \alpha'\delta'\gamma'$, where $\delta$ replaces $\beta$, and $\delta'$ replaces $\beta'$, respectively.

The new entry 64 generated, using this deduction rule, can then be considered for adding to the generalized phrase-table: ($\alpha\delta\gamma \leftrightarrow_{gpt} \alpha'\delta'\gamma'$).

The left and right contexts $\alpha$, $\gamma$, $\alpha'$, $\gamma'$ immediately precede (resp. follow) the respective sequence and can each be a single word, a few words, or a phrase, i.e., sufficiently short for the template instances to be found, with at least a threshold frequency, in the bilingual corpus 38. The left and right context, together with the sequence, can be the length of an extracted phrase or can be shorter or longer in length. There may be constraints placed on the number of words in the left and/or right contexts, such as a maximum of ten words and/or a minimum of one or two words in each context and/or in the total context, for at least one of the contextual phrases in each phrase pair.

In the exemplary embodiment, one but not both of the left and right contexts for $\beta$ and/or $\beta'$ may be empty. The method may also be used for cases where there is no left or right context, but is more effective where there is at least some context.

Filtering the Generated Candidate Phrase Pairs (S110)

The exemplary method may generate a large number of candidate phrase pairs 64 for potentially adding to the generalized phrase table 34. Some of these candidate phrase pairs may contain translation errors, which may be filtered out. There may be different kinds of errors, e.g., in morphology, declension, etc. One way to remove some of the translation errors is to check that the extracted contextual phrase pairs, the templates generated therefrom, and/or the candidate phrase pairs are consistent with the grammatical tags of the dictionary vocabulary terms, for example, with a set of linguistic rules. For example, a linguistic rule could be implemented that in a phrase pair which includes a feminine word in French, that word should not be preceded by the masculine determiner Le. Similarly, a singular word should not be associated with a plural verb. Another linguistic rule could be implemented which filters out phrase pairs where the determiners Le and La are followed by a word starting with a vowel, which should be contracted to L'.

Additionally, the sheer number of candidate phrase pairs may make the generalized phrase table 34 unwieldy. It may thus be desirable to reduce the number of candidate phrase pairs added, in order to make the SMT system 12 run more efficiently. In this case, it is desirable to retain the candidate phrase pairs which are of most benefit to the in-domain translations to be performed. This type of filtering may be based on a measure of proximity to an in-domain corpus. In one embodiment, to perform filtering, a technique based on the cross-entropy difference score may be employed. Such techniques have been used in data selection for domain adaptation. The filtering process can be applied to the target side monolingually (as in the method of Moore 2010) or to both source and target sides (as in Axelrod 2011).

1. Monolingual (Target Side Only) Phrase Pair Selection

In this embodiment, the set 66 of language models includes in-domain and out-of-domain language models 80, 82 denoted $LM_{ID(t)}$ and $LM_{OoD(t)}$. Each language model 80, 82 reflects the probability of observing each of a collection of n-grams in a respective target language corpus of sentences. $LM_{ID(t)}$ is trained on in-domain target data, such as a monolingual corpus 68 of sentences in the target domain, and $LM_{OoD(t)}$ may be trained on a subset 70 of the out-of-domain target data from the training corpus 38.

For each candidate phrase pair 64, the respective phrase in the target language is compared with the two language models $LM_{ID(t)}$ and $LM_{OoD(t)}$ 80, 82 to obtain their in-domain and out-of-domain cross-entropies ($H_{ID(t)}$ and $H_{OoD(t)}$). Then, the candidate phrase pair 64 is scored as the cross-entropy difference $\hat{H}_{P_p}(t)$:

$$\hat{H}_{P_p}(t) = H_{ID}(t) H_{OoD}(t) \quad (2)$$

The cross entropy, in this case, is a measure of how unexpected the target phrase of the candidate phrase pair is, given the respective language model 80, 82. Thus, phrases which are more expected in view of a language model are given a low cross-entropy score and phrases which are less expected are given a high cross-entropy score. The score $\hat{H}_{P_p}(t)$, which can take positive or negative values, is an indication of the relative proximity of the target phrase t to the in-domain corpus: a lower score indicates higher proximity. A phrase which is more likely to be found in the domain of interest than in the out-of-domain data will have a low $H_{ID(t)}$ and a high $H_{OoD}(t)$, resulting in an overall very low $\hat{H}_{P_p}(t)$ score. This score is analogous to that of Moore 2010, but here, it is used to perform filtering over candidate phrase pairs, while in Moore 2010, it is applied to elements of the general corpus, in order to perform sentence selection.

Then, the set of phrase pairs 64 is sorted according to the respective score ($\hat{H}_{P_{p(t)}}$) on the target side (t). The phrase pair 64 with the lowest score is placed at the top and the highest scoring one at the bottom. A set of the highest-positioned phrase pairs 64 is then selected for inclusion in the generalized phrase table 34. This may be performed by filtering out the phrase pairs 64 which do not meet a threshold cross-entropy difference.

One way to select the threshold is as follows. Several LMs are trained using incremental parts of the sorted phrase pairs 64. The increment can be 2%, this means the top 2% is used first, then the top 4%, and so on up to 100% of the sorted phrases to train new LMs. These LMs are scored on a development corpus though perplexity (see, for example, FIG. 3). The development corpus is an in-domain corpus, which can be, but need not be, the same as the in-domain monolingual corpus 68. Then, using dichotomy, the LM which has the lowest perplexity is identified. This LM corresponds to a threshold in the sorted table of phrase pairs. All phrase pairs below that threshold are filtered out.

2. Bilingual (Target and Source Side) Phrase Pair Selection

When the monolingual phrase filtering is applied on both source and target (s,t) sides of the phrase pairs, the approach becomes a bilingual phrase filtering, as described in the following equation:

$$\hat{H}_{P_p}(s,t) = [H_{ID}(s) - H_{OoD}(s)] + [H_{ID} - H_{OoD}(t)] \quad (3)$$

The method is similar to the monolingual filtering method. Here, however, the scoring considers both source and target sides. The method uses two additional language models $LM_{ID(s)}$ and $LM_{OoD(s)}$ 84, 86. Language model $LM_{ID(s)}$ is trained on in-domain source data and $LM_{OoD(s)}$ may be trained on a subset of the out-of-domain source data, analogous to corpora 68, 70.

It is not necessary to have bilingual data available for training $LM_{ID(t)}$ and $LM_{ID(s)}$, since each can be trained using a respective monolingual corpus. $LM_{ID(s)}$ is used to compute $H_{ID}(S)$ and $LM_{OoD(s)}$ is used to compute $H_{OoD}(s)$.

To identify the threshold cross entropy difference, the finding the lowest perplexity score is performed only on the target side, as for the target side-based filtering. This means that only a monolingual in-domain development corpus is needed, as in the previous case. It is also possible for the candidate phrase pair filtering to use source sides of the target in-domain and out-of-domain corpora used in the monolingual process. However, since there is often a lack of in-domain bitexts, an artificial in-domain comparable corpus may be generated for the data selection approach. As an example, the comparable corpus could be extracted from the UN corpus.

Once the language model with the lowest perplexity is identified, the same percentage of candidate phrase pairs as that used to create the language model is selected.

As will be appreciated other methods for selecting the threshold are contemplated. For example, for each dictionary entry, a predetermined maximum and/or minimum number of candidate phrase pairs could be selected, or a predetermined maximum and/or minimum proportion of the candidate phrase pairs could be selected. A combination of different approaches could be used. For example, a threshold could be selected using the monolingual or bilingual selection method, provided that it satisfies the predetermined maximum and/or minimum number and/or proportion of candidate phrase pairs.

Phrase Table Generation (S112)

The features for each remaining candidate phrase pair 64 to be incorporated as a phrase pair in the generalized phrase table 34 can be derived from the features of the contextual phrase pairs 60 from which the template 62 is generated. For example, the forward and backward lexical and phrasal probabilities for the phrase pair 64 can each be an aggregate (such as a sum or average) of the corresponding probabilities of the contextual phrase pairs 60 that are instances of the template.

In one embodiment, a candidate phrase pair 64 is generated for each occurrence of each contextual phrase pair 60 matching the template. Thus, if the contextual phrase pair (or pairs) occurs ten times in the bilingual corpus 38, ten candidate phrase pairs are generated for each vocabulary pair. These are then added to the collection of phrase pairs generated from the bilingual corpus and the feature values are computed for the entire set of phrase pairs at that time.

In another embodiment, an additional binary feature may be added to the set of features which indicates whether the phrase pair was derived from the original phrase table 40 or the candidate phase pairs 64. This may be used to give preference to using phase pairs 64 in a translation output by the SMT system.

Two examples of the method, where the classes are Named Entities and Out-of-Vocabulary (OOV) words, are now given by way of example.

Named Entities

Consider the case where not all possible country names exist in the training corpus 38, or occur too infrequently to extract meaningful phrase probabilities, and the aim is to add them and use them in the SMT translation model. For example, the name "Ecuador," appears only about 100 times in the Europarl corpus. See, Philipp Koehn, "Europarl: A parallel corpus for statistical machine translation," Proc. 10th Mach. Translation Summit (MT Summit X), pp. 79-86

(2005). This is 60 times less than the name "Germany" occurs in the English-French corpus alone. Thus, the observed linguistic contexts around the under-represented country names may not be statistically representative enough to be efficient. The exemplary method creates new translation information for these under-represented specific terms.

The method first provides for a user to identify the country to be handled, e.g., $\delta \leftrightarrow_{lex} \delta$ may be, for example Ecuador, Équateur, in the English, French case.

To identify and extract named entities of the same class, the contextual phrase pair extraction component 50 may include a parser with a named entity recognition component, such as the Xerox Incremental Parser XIP (see, Salah Aït-Mokhtar, et al., "Robustness beyond shallowness: Incremental deep parsing," Nat. Lang. Eng., 8(3):121-144 (2002) and U.S. Pat. No. 7,058,567). The extraction may be performed on the whole training corpus 38, to be the most accurate possible.

Once the NE-containing phrase pairs 60 having the same left and right contexts are identified, the NE is replaced by a place-holder to generate a template 62. Table 1 is an example of template extraction using the place-holder @COUNTRY@ replacing the name of the country.

TABLE 1

Template Generation

| Germany is | ||| | L' Allemagne est |
|---|---|---|
| Spain is | ||| | L' Espagne est |
| Italy is | ||| | L' Italie est |
| @COUNTRY@ is | ||| | L' @COUNTRY@ est |

After the alignment process and the phrase-table construction, the replacements can be processed.

To be faster, the extraction process can alternatively be performed on the phrase pairs already extracted from the training corpus 38. The context extracted is already evaluated and the additional information is directly added to the set of phrase pairs 34 used to train the translation model without performing the whole training process again.

In the example of the country "Ecuador," a new phrase pair is generated by replacing the place-holder with the country name "Ecuador" and its French translation "Équateur", as illustrated in Table 2.

TABLE 2

Example of phrase pair generation using country names

| @COUNTRY@ is | ||| | L' @COUNTRY@ est |
|---|---|---|
| Ecuador is | ||| | L' Équateur est |

Specific Terminology (and OOVs)

As for the case of named entities, the method can also handle the more general case of OOVs. These OOVs can correspond to vocabulary coming from some specific terminology. This approach aims to add some specific terminology directly to a set of phrase pairs used to train the translation model without the need for relauching the entire training process.

Starting from a selected grammar class (such as verbs, adjectives, or nouns), words in the phrase pairs are extracted and replaced by corresponding data.

For example, the adjective "little" may have different meanings in French: "petit", "peu", "quelque," etc.

In the same way as the country names are processed, the corresponding phrase pairs for the specific adjectives are added to the translation model. Table 3 provides an example of an adjective as the placeholder.

TABLE 3

Example of replacement of the place-holder @ADJ@ by the associated adjective form

| Source language | | | Target language | | |
|---|---|---|---|---|---|
| the ... @ADJ@ | rabbit | ||| | le | @ADJ@ | lapin |
| the | little | rabbit | ||| | le | petit | lapin |
| the | little | rabbit | ||| | le | petits | lapin |
| the | little | rabbit | ||| | le | petite | lapin |
| the | little | rabbit | ||| | le | petites | lapin |
| the | little | rabbit | ||| | le | quelque | lapin |
| the | little | rabbit | ||| | le | quelques | lapin |
| ... | | | | | |

As can be seen in the examples of the generation in Tables 2 and 3, the process may propose some erroneous hypotheses. This can be addressed by filtering the phrase pairs. In the example in Table 2, in addition to finding the right context, the right morphological form (L') should be selected.

Filtering the Generated Phrase Pairs

As described above, new entries are generated ($\alpha\delta\gamma \leftrightarrow \alpha'\delta'\gamma'$) in both source and target sides. But this process can generate some errors (e.g., "Ecuador"→"le Équateur"). There may be different kinds of errors (morphology, declension, etc.).

TABLE 4

Example of template extraction using the place-holder @COUNTRY@ for replacing the name of the country

| Denmark is | ||| | Le Danemark est |
|---|---|---|
| United-Kingdom is | ||| | Le Royaume-Uni est |
| Portugal is | ||| | Le Portugal est |
| @COUNTRY@ is | ||| | Le @COUNTRY@ est |

For example, using extracted templates as shown in Table 4, the phrase pairs generated with the country "Ecuador" shown in Table 5 contain errors. In French, the word "Le" should be transformed into "L'" when it precedes a vowel.

TABLE 5

Phrase generation examples with country names

| @COUNTRY@ is | ||| | L' @COUNTRY@ est |
|---|---|---|
| Ecuador is | ||| | L' Équateur est |
| @COUNTRY@ is | ||| | Le @COUNTRY@ est |
| Ecuador is | ||| | Le Équateur est |
| @COUNTRY@ is | ||| | La @COUNTRY@ est |
| Ecuador is | ||| | La Équateur est |
| @COUNTRY@ is | ||| | Les @COUNTRY@ est |
| Ecuador is | ||| | Les Équateur est |

Many such problems can appear and thus grammatical filtering of the generated phrase pairs, as described above, is desirable.

Without intending to limit the scope of the exemplary embodiment, the following example describes application of the generation method to country names.

Example

The generation approach aims to add context to the new data added to the translation model (TM). This added context is very useful for SMT. To demonstrate this, several setups for the generation process are considered. These setups concern the addition of specific terminology associated with country names, with particular focus on the English-to-French translation of the country name "Germany."

1. Baseline Method (baseline): First, all the translation hypotheses for "Germany"—"Allemagne" are deleted from the translation model phrase table 40. In particular, all the phrase pairs which contain these two words are deleted. This is done during the training and before the final estimation of the TM. This process will not penalize the TM feature estimation process and especially any smoothing of the features in the TM.

2. Adding unknown words as unigrams (uniqrams): In this setup, the translation of "Germany" by "Allemagne" is added to the baseline phrase table as a single phrase pair without context. For this, the original single phrase pair (England, Angleterre) is selected, replacing the word "England" by "Germany" and "Angleterre" by "Allemagne."

This process enables the feature estimation of the original phrase pair to be used for the new one.

3. Oracle context generation for unknown words (oracle context): After having added the single word phrase pairs as in (2), phrasal contexts taken from the phrase pairs that contain "England" on the source side and "Angleterre" on the target side are added.

This phrase pair was chosen because the gender and number of "Allemagne" and "Angleterre" are the same in French. This setup is placed in the most advantageous position for context.

4 Generating the context for unknown words automatically (gen. context (no threshold)): In this setup, countries are generalized with a class. Then, all the country names with this class are replaced in the training corpus. This gives a number of generic phrase pairs containing the placeholder in the extracted phrase table. Then the placeholder is replaced with the entries of the country names dictionary (In the example, it only includes "Germany" and "Allemagne").

Table 6 shows an example of (unfiltered) candidate phrase pairs generated using a complete country names dictionary.

TABLE 6

Generation examples using a complete country names dictionary

| | | |
|---|---|---|
| in @COUNTRY@, there is | ||| | dans l' @COUNTRY@, il y a |
| in France, there is | ||| | dans l' France, il y a |
| in Germany, there is | ||| | dans l' Allemagne, il y a |
| in Ecuador, there is | ||| | dans l' Équateur, il y a |
| in England, there is | ||| | dans l' Allemagne, il y a |
| in Chile, there is | ||| | dans l' Chili, il y a |
| ... | | |
| for @COUNTRY@, citizen | ||| | pour les @COUNTRY@, citizen |
| for France, citizen | ||| | pour les France, citizen |
| for Germany, citizen | ||| | pour les Allemagne, citizen |
| for Ecuador, citizen | ||| | pour les Équateur, citizen |
| for England, citizen | ||| | pour les Allemagne, citizen |
| for Chile, citizen | ||| | pour les Chili, citizen |
| ... | | |
| ... | | |

4. Filtering (gen. context ($\hat{H}_{P_y}(t)$) and gen. context ($\hat{H}_{P_g}(s,t)$): In these two set-ups, following the method for set-up 3, the generated candidate phrase pairs are filtered using the approaches described above for target side-based filtering and source and target side-base filtering.

Figure 3:
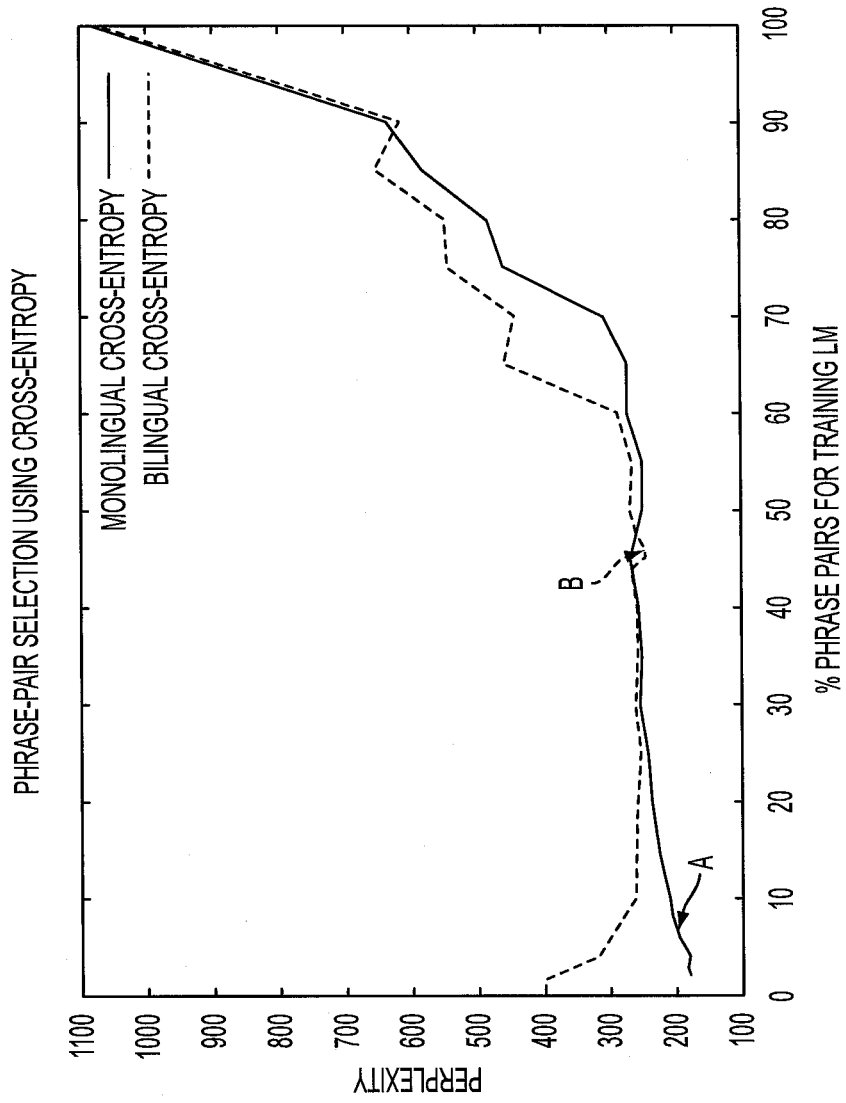
FIG. 3 shows plots of perplexity scores, estimated on a development corpus, for Language Models trained on different percentages of candidate phrase pairs sorted using a monolingual or bilingual cross-entropy difference score.

FIG. 3 shows the perplexity curves estimated on the development corpus for these two approaches. Each point of these curves corresponds to a perplexity score of a LM, trained with a certain percentage of phrase pairs. The solid curve corresponds to a corpus sorted using a monolingual cross-entropy difference score, and the dotted curve to a training corpus of phrase pairs, sorted with a bilingual cross-entropy difference score.

In the example case, the in-domain data 68 and the development corpus 72 are each composed of a set of sentences, which contain the word "Allemagne" at least once. These sentences have been extracted from the MultiUN corpus (Andreas Eisele, et al., "MultiUN: A Multilingual Corpus from United Nation Documents," Proc. 7th Conf. on Intl Language Resources and Evaluation (LREC'10), pp. 2868-2872 (2010)). Taking the percentage at the lowest perplexity, the monolingual approach selects only 4% of the phrase pairs generated (shown at A), the bilingual approach selects 45% (shown at B).

Experimental Protocol

For these experiments, phrase-based SMT systems 12 were built using the open-source MT toolkit Moses (Philipp Koehn, et al., "Moses: Open Source Toolkit for Statistical Machine Translation," Proc. 45th Annual Meeting of the Assoc. for Computational Linguistics Companion Volume Proc. Demo and Poster Sessions, pp. 177-180 (2007)). Backoff n-gram language models (n=5 unless otherwise specified) were used, applying Kneser-Ney smoothing (Stanley F. Chen et al., "An empirical study of smoothing techniques for language modeling," Computer Speech and Language, 4(13): 359-394 (1999)) in the SRILM toolkit (Andreas Stolcke, "SRILM—an extensible language modeling toolkit," Proc. ICSLP, pp. 1-4 (2002)). The optimization process of the features weights used is detailed below.

The evaluation metrics used were BLEU (Kishore Papineni, et al., "BLEU: a method for automatic evaluation of machine translation," Proc. 40th Annual Meeting of the Assoc. of Computational Linguistics (ACL), pp. 311-318 (2002)) and TER (Matthew Snover, et al., "A study of translation edit rate with targeted human annotation," Proc. 5th Conf. of the Assoc. for Machine Translation in the Americas (AMTA), pp. 223-231 (2006)).

The SMT translation model is trained with Europarl V.7 (ep7) and News-Commentary V.8 (nc8). Once the phrase pair extraction is complete, the phrase pairs that contain "Allemagne" or "Germany" are removed. The rest of the phrase pairs are used to train the Translation Model. The development corpus 72 is the test set of the 2011 WMT evaluation (ntst11).

The domain-specific test corpus is a set of 2500 sentences picked from the MultiUN (UN) corpus, noted "tstTerm", which is constrained by taking only sentences that contains at last one translation from "Germany" into "Allemagne".

Another test set, (ntst12) is from the 2011 WMT evaluation. This test set (which does not focus on country names) is used as a regression test for controlling the behavior of the different setups.

All these data are detailed in Table 7 and come from the WMT13 evaluation (http://www.statmt.org/wmt13/).

TABLE 7

Data used in experiments

| Type | Corpus | # lines | # src words (En) | # tgt words (Fr) |
|---|---|---|---|---|
| Training | ep7 | 2007K | 56,192K | 61,811K |
| | nc8 | 157K | 4105K | 4815K |
| Development | ntst11 | 3003 | 75K | 86K |
| Evaluation | ntst12 | 3003 | 74K | 83K |
| | tstTerm | 2577 | 87K | 103K |

Stability Test

To provide a more reliable precision in the experiments, several optimizations were performed with random initialization towards the BLEU score for each experiment. See, Jonathan H. Clark, et al., "Better hypothesis testing for statistical machine translation: Controlling for optimizer instability," Proc. 49th Annual Meeting of the Assoc. for Computational Linguistics: Human Language Technologies, pp. 176-181 (2011), for a description of this method.

Following this method, three runs of Minimum Error Rate Training (MERT) were made (see, Franz Josef Och, "Minimum Error Rate Training in Statistical Machine Translation," Proc. 41st Annual Meeting of the Assoc. for Computational Linguistics, pp. 160-167. 2003). Then, the result is an average of these three runs and the standard deviation is given between parentheses next to the scores (Table 8).

This optimization approach was used to observe how the parameters were influenced by the process.

Results

Table 8 provides statistics for the different models generated: the number of possible phrase pairs in the Translation Model (TM) phrase table 34 is shown in the first column; the second one shows the number of candidate phrase pairs added to the baseline; then for each test corpus, the amount of Out-Of-Vocabulary words (OOV) that have not been translated using the corresponding TM is shown.

TABLE 8

Phrase pair Data

| Evaluation set: | TM size | # of phrase pairs added | ntst12 (regression test) # OOV (rate) | tstTerm (specific test) # OOV (rate) |
|---|---|---|---|---|
| baseline | 77,138,148 | N/A | 4210 (5.7%) | 5237 (6.0%) |
| unigrams | 77,138,149 | 1 | 4183 (5.6%) | 2565 (2.9%) |
| oracle context | 77,139,126 | 978 | 4183 (5.6%) | 2565 (2.9%) |
| Gen. context (no threshold) | 78,611,118 | 1,472,970 | 4183 (5.6%) | 2565 (2.9%) |
| gen. context ($\hat{H}_{Pp}(t)$) | 77,193,106 | 54,958 | 4183 (5.6%) | 2565 (2.9%) |
| gen. context ($\hat{H}_{Pp}(s,t)$) | 77,754,665 | 616,517 | 4183 (6%) | 2565 (2.9%) |

Tables 9 and 10 show results for the different setups for the translation model (TM) and the target language model (LM). In the case of Table 9, the LM contains the word added ("Allemagne") in its vocabulary, whereas for Table 10, the LM does not contain the added word ("Allemagne") in its vocabulary. The results were evaluated for the BLEU and TER scores, the standard deviation is given between parentheses.

The regression test set (ntst12), is used to control each system's deviation. The specific test set (denoted tstTerm) contains at least one OOV per sentence.

TABLE 9

LM includes added word

| Evaluation set: | ntst12 (regression test) | | tstTerm (specific test) | |
|---|---|---|---|---|
| TM | BLEU | TER | BLEU | TER |
| baseline | 21.2 (0.1) | 65.0 (0.2) | 27.2 (0.1) | 58.9 (0.2) |
| unigrams | 21.2 (0.1) | 64.8 (0.2) | 30.6 (0.2) | 56.1 (0.2) |
| oracle context | 21.2 (0.1) | 64.6 (0.2) | 30.9 (0.2) | 55.7 (0.2) |
| generated context (no threshold) | 21.1 (0.1) | 64.9 (0.2) | 31.1 (0.1) | 55.6 (0.3) |
| generated context ($\hat{H}_{Pp}(t)$) | 21.2 (0.1) | 64.8 (0.2) | 30.5 (0.1) | 56.1 (0.3) |
| gen. context ($\hat{H}_{Pp}(s,t)$) | 21.4 (0.1) | 64.4 (0.1) | 31.0 (0.1) | 55.6 (0.1) |

TABLE 10

LM does not include added word

| Evaluation set: | ntst12 (regression test) | | tstTerm (specific test) | |
|---|---|---|---|---|
| TM | BLEU | TER | BLEU | TER |
| baseline | 21.2 (0.1) | 64.3 (0.3) | 27.2 (0.1) | 58.5 (0.2) |
| unigrams | 21.1 (0.1) | 64.9 (0.1) | 28.4 (0.0) | 57.0 (0.1) |
| oracle context | 21.0 (0.1) | 65.1 (0.2) | 28.4 (0.0) | 57.2 (0.1) |
| gen. context (no threshold) | 21.1 (0.0) | 64.9 (0.4) | 28.8 (0.4) | 56.6 (0.1) |
| gen. context ($\hat{H}_{Pp}(t)$) | 21.2 (0.1) | 65.1 (0.2) | 28.6 (0.2) | 57.0 (0.2) |
| gen. context ($\hat{H}_{Pp}(s,t)$) | 21.1 (0.1) | 64.8 (0.2) | 29.2 (0.1) | 56.7 (0.2) |

The results shown in Table 9 compare the seven setups when the LM includes the OOV word. The "baseline" can be compared first with the "unigrams", which was enhanced by adding the phrase pair "Germany→Allemagne". This single translation is added as if it would come from a bilingual dictionary. This system is an improvement over the baseline (over 3 point on the BLEU scale). It shows that OOV greatly impact the automatic metrics. For the oracle context setup, where the phrase table incorporated a set of augmented phrase pairs where "Germany" is replaced by "England" and "Angleterre" by "Allemagne", the OOV rate is the same as for the unigram setup. There is small improvement over the unigram setup in both BLEU (30.6 to 30.9 points) and TER (56.1 to 55.7 points). For the automatic generation used in the exemplary method, the experiment without filtering (denoted "gen. context (no threshold)") adds all the candidate phrase pairs 64 to the set of phrase pairs 34 used to train the translation model. This approach improves the BLEU score from 30.9 to 31.1 points over the oracle setup. For the two setups using the monolingual phrase pair selection ("gen. context ($\hat{H}_{P_p}(t)$)") and the bilingual phrase pair selection ("generated context ($\hat{H}_{P_p}(s,t)$)"), the first gives a decrease of the BLEU and TER scores, suggesting that the filtering was too strong, as evidenced by FIG. 3. The bilingual phrase pair selection enables the method to perform as well as the approach with no threshold, but while keeping only 45% of the phrase pairs generated. This suggests that performance can be as good as when a larger phrase table is used, thus improving efficiency of the SMT system.

The results shown in Table 10 for the experiment in which the word "Allemagne" was removed from the language model (LM), shows the importance of the language model. When compared with Table 9, the results are consistently worse. The regression test in all setups (ntst12) shows there is little influence on this test set. Only the bilingual phrase pair selection improves the results a little (0.2 BLEU points). This mainly shows that the updates do not disturb the model.

Analysis of the Results

Some examples from the translation output are presented to demonstrate the linguistic influence of the updates.

In Example 1 (Table 11) it can be seen what happens when the translation model does not have phrasal contexts. In this case, it could not provide the generation of the "L". This elided article is needed in French with the word "Allemagne." With the generated context, but without any threshold, the hypothesis provided may include "En", which is wrong; the right output appears when the language model contains in its vocabulary the word "Allemagne" and when the generated context is filtered using the bilingual cross-entropy difference score.

In Example 2 (Table 12) the influence of the translation of "in", which can be translated as "dans" or "en" in French, is seen. The right translation in this case is "en" just before "Allemagne."

If the candidate translation is part of the LM vocabulary (Adapted LM), it can be observed that in all cases the translation of "in" into "en" is performed. Later in the same example an interesting choice of hypothesis can be seen: the inversion of the two parts "for example" and "in Germany." This hypothesis is good even if it does not exactly match the reference (manual) translation.

If the LM does not have the target hypothesis in its vocabulary (No LM Adaptation), the translation model is strong enough to propose the right answer using the bilingual cross-entropy filtering ($\hat{H}_{P_p}(s,t)$). It can be seen that for the last system: even if the LM does not have the word in its vocabulary, the translation will be performed successfully.

These two examples illustrate the influence of the context included into the translation model though the phrase pair generation. The results associated with these examples indicate the success of the filtering process.

TABLE 11

Example 1
Source   Germany, the major economy of the euro area . . .
Reference Translation   L' Allemagne, principal économie de la zone euro . . .

| TM | LM | Translation output |
|---|---|---|
| baseline | No LM Adaptation | Germany majeur, l' économie de la zone euro . . . |
| unigrams | | Allemagne, l' économie de la zone euro . . . |
| oracle context | | Allemagne, l' économie de la zone euro . . . |
| gen. context (no threshold) | | Allemagne majeur, l' économie de la zone euro . . . |
| gen. context ($\hat{H}_{P_p}(t)$) | | Allemagne majeur, l' économie de la zone euro . . . |
| gen. context ($\hat{H}_{P_p}(s,t)$) | | Allemagne majeur, l' économie de la zone euro . . . |
| baseline | Adapted LM | Germany, la grande économie de la zone euro . . . |
| unigrams | | L' Allemagne, importante l' économie de la zone euro . . . |
| oracle context | | L' Allemagne, la grande économie de la zone euro . . . |
| gen. context (no threshold) | | En Allemagne, l' économie de la zone euro . . . |
| gen. context ($\hat{H}_{P_p}(t)$) | | Le cas de l' Allemagne, la grande économie de la zone euro . . . |
| gen. context ($\hat{H}_{P_p}(s,t)$) | | L' Allemagne, la grande économie de la zone euro . . . |

TABLE 12

Example 2
Source   for example, in Germany, . . .
Reference Translation   par exemple, en Allemagne, . . .

| TM | LM | Translation output |
|---|---|---|
| baseline | No LM Adaptation | par exemple, en Germany, . . . |
| unigrams | | par exemple, dans Allemagne, . . . |
| oracle context | | par exemple, dans Allemagne, . . . |

TABLE 12-continued

Example 2
Source   for example, in Germany, . . .
Reference Translation   par exemple, en Allemagne, . . .

| TM | LM | Translation output |
|---|---|---|
| generated context (no threshold) | | par exemple, dans Allemagne, . . . |
| generated context ($\hat{H}_{P_p}(t)$) | | par exemple, dans Allemagne, . . . |
| gen. context ($\hat{H}_{P_p}(s,t)$) | | par exemple, en Allemagne, . . . |
| baseline | Adapted LM | par exemple, en Germany, . . . |
| unigrams | | par exemple, en Allemagne, . . . |
| oracle context | | par exemple, en Allemagne, . . . |
| gen. context (no threshold) | | en Allemagne, par exemple, . . . |
| generated context ($\hat{H}_{P_p}(t)$) | | par exemple, en Allemagne, . . . |
| gen. context ($\hat{H}_{P_p}(s,t)$) | | par exemple, en Allemagne, . . . |

These examples do not consider linguistic information. Further improvements are expected when the dictionary entries are tagged with linguistic information to aid in filtering and/or by implementing rules to remove non-compliant phrase pairs.

It will be appreciated that variants of the above-disclosed and other features and functions, or alternatives thereof, may be combined into many other different systems or applications. Various presently unforeseen or unanticipated alternatives, modifications, variations or improvements therein may be subsequently made by those skilled in the art which are also intended to be encompassed by the following claims.

What is claimed is:

1. A method for terminological adaptation of a machine translation system comprising:
   receiving a set of vocabulary pairs, each vocabulary pair including a source term in a source language and a target term in a target language, each term being in a class which includes a set of sequences;
   extracting contextual phrase pairs from a bilingual training corpus, each of the contextual phrase pairs including a source phrase and a target phrase, the source phrase including a source sequence of a same class as the source term of one of the vocabulary pairs and associated source context, the target phrase including a target sequence of a same class as the target term of the one of the vocabulary pairs and associated target context;
   generating templates based on the extracted contextual phrase pairs, each template replacing the source and target sequences of a contextual phrase pair with respective source and target placeholders denoting the class;
   generating at least one candidate phrase pair from each template, each candidate phrase pair replacing the source and target placeholders of the template with respective source and target terms of a vocabulary pair of the same class; and
   incorporating at least some of the candidate phrase pairs into a phrase table of a machine translation system,
   wherein at least one of the extracting contextual phrase pairs, generating templates, and generating candidate phrase pairs is performed with a processor.

2. The method of claim 1, further comprising filtering the candidate phrase pairs based on at least one of linguistic rules and a measure of proximity to an in-domain corpus.

3. The method of claim 2, wherein the filtering is based on a measure of proximity to an in-domain corpus and includes computing a cross-entropy difference score for each phrase pair and filtering out candidate phrase pairs which do not meet a threshold cross-entropy difference score.

4. The method of claim 3, wherein the computing of the cross-entropy difference score comprises:
   computing a first measure of perplexity between the target phrase of the candidate phrase pair and an in-domain language model;
   computing a second measure of perplexity between the target phrase of the candidate phrase pair and an out-of-domain language model; and
   computing a difference between the first measure of perplexity and the second measure of perplexity.

5. The method of claim 3, further comprising:
   generating a set of language models, each language model being generated from a portion of the candidate phrase pairs, each portion having a different number of the candidate phrase pairs;
   scoring the language models on a development corpus;
   identifying one of the language models based on the scores; and
   selecting the threshold cross-entropy difference score based on the identified language model.

6. The method of claim 2, wherein the filtering is based on linguistic rules, the linguistic rules including at least one linguistic rule which requires the associated context to be compatible with the respective source or target term in at least one of declension, verb tense, and morphology.

7. The method of claim 1, wherein the set of vocabulary pairs includes a plurality of vocabulary pairs of a same class and the generating at least one candidate phrase pair from each template includes generating a candidate phrase pair for each of the plurality of vocabulary pairs from each template matching the class.

8. The method of claim 1, wherein the class is a class of out-of-vocabulary words.

9. The method of claim 8, wherein the class is a class of named entities.

10. The method of claim 1, further comprising assigning feature values to each of the candidate phrase pairs incorporated into the phrase table, the feature values being based on feature values of phrase pairs extracted from the bilingual training corpus that are instances of the template from which the respective candidate phrase pair is generated.

11. The method of claim 1, wherein the extracting of the contextual phrase pairs from the bilingual training corpus includes extracting the contextual phrase pairs from an original phrase table generated from the bilingual training corpus.

12. The method of claim 1, wherein the associated context for each source and target sequence includes at least one of:
   at least one word preceding the respective sequence; and
   at least one word following the respective sequence.

13. The method of claim 1, further comprising tuning the machine translation system based on the candidate phrase pairs incorporated into the phrase table.

14. A computer program product comprising a non-transitory recording medium storing instructions, which when executed on a computer, causes the computer to perform the method of claim 1.

15. A system for terminological adaptation of a machine translation system comprising memory which stores instructions for performing the method of claim 1 and a processor in communication with the memory which implements the instructions.

16. A system for terminological adaptation of an associated machine translation system comprising:
   an extraction component which extracts contextual phrase pairs from an associated bilingual training corpus, each of the contextual phrase pairs including a source phrase and a target phrase, the source phrase including a source sequence of a same class as a source term of an input vocabulary pair and respective associated context, the target phrase including a target sequence of a same class as a target term of the input vocabulary pair and respective associated context;
   a template generator which generates templates based on the extracted contextual phrase pairs, each template replacing the source and target sequences of a contextual phrase pair with respective source and target placeholders denoting the respective class;
   a phrase table entry generation component which generates at least one candidate phrase pair from each template, each candidate phrase pair replacing the source and target placeholders of a template with respective source and target terms of the input vocabulary pair, the phrase table entry generation component incorporating at least some of the candidate phrase pairs into a phrase table of a machine translation system; and
   a processor which implements the extraction component, template generator, and phrase table entry generation component.

17. The system of claim 16, further comprising a filtering component which filters the candidate phrase pairs based on at least one of linguistic rules and a measure of proximity to an in-domain corpus.

18. The system of claim 16, further comprising a tuning component which tunes the machine translation system based on the candidate phrase pairs incorporated into the phrase table.

19. A method for terminological adaptation of a machine translation system to a target domain comprising:
   extracting contextual phrase pairs from an out-of-domain bilingual training corpus of the form $\alpha\beta\gamma \leftrightarrow \alpha'\beta'\gamma'$, each of the contextual phrase pairs including a source phrase $\alpha\beta\gamma$ and a target phrase $\alpha'\beta'\gamma'$, the source phrase including a source sequence $\beta$, which is of a same class T as a source term $\delta$ of an input vocabulary pair in a target domain, and respective associated context $\alpha$, $\gamma$, the target phrase including a target sequence $\beta'$ of a same class T' as a target term $\delta'$ of the input vocabulary pair and respective associated context $\alpha'$, $\gamma'$;
   based on the extracted contextual phrase pairs, generating candidate phrase pairs of the form $\alpha\delta\gamma \leftrightarrow \alpha'\delta'\gamma'$, where $\delta$ replaces $\beta$ and $\delta'$ replaces $\beta'$, respectively, in one of the extracted contextual phrase pairs;
   filtering the extracted candidate phrase pairs; and
   incorporating at least some of the remaining candidate phrase pairs into a phrase table of a machine translation system,
   wherein at least one of the extracting contextual phrase pairs and generating candidate phrase pairs is performed with a processor.

20. The method of claim 19, wherein the filtering includes
   computing a first measure of perplexity between the target phrase of the candidate phrase pair and a target domain language model;
   computing a second measure of perplexity between the target phrase of the candidate phrase pair and an out-of-domain language model; and
   computing a difference between the first measure of perplexity and the second measure of perplexity.

* * * * *